Patented June 3, 1930

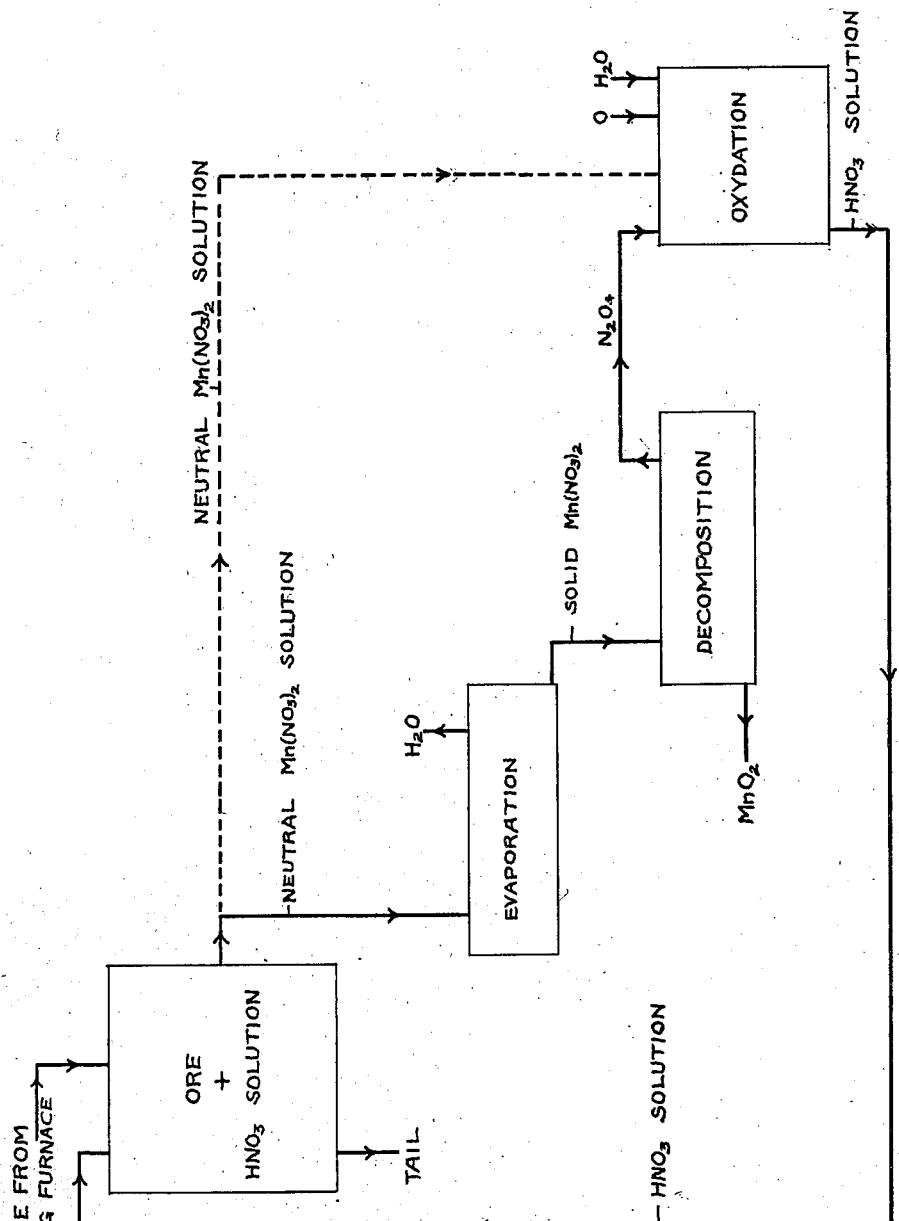

1,761,133

UNITED STATES PATENT OFFICE

NAPOLEON ARTHUR LAURY, OF ROCKVILLE CENTER, NEW YORK, ASSIGNOR TO JOHN C. WIARDA & COMPANY, OF BROOKLYN, NEW YORK, A CORPORATION OF NEW YORK

PROCESS OF MANGANESE-COMPOUND RECOVERY

Application filed July 22, 1925. Serial No. 45,150.

My invention relates to the recovery of manganese compounds from manganese bearing ores and its primary object is to provide a process whereby such compounds may be efficiently produced from low grade manganese bearing ores containing say less than twenty per centum of manganese, of which large deposits exist, as well as from higher grade manganese bearing ores.

Having actually carried out the new process of my invention, I am enabled to set it forth in this specification in considerable detail, and I do so in order to teach those skilled in the art fully in its use, but I desire that it shall be understood that details, though important and made the subject matter of the more limited of the appended claims, may be varied and that the broader scope of my invention is to be measured by the broader of the appended claims.

Manganese exists in the ores with which I am concerned, principally in its higher oxides, such as manganese dioxide, and my process is accordingly accommodated to that fact, but it is important that my process is effective in the treatment of ores which contain manganese as carbonates.

At the outset I grind the crude ore to finely divided form (for example I have gone as far as two hundred mesh), and then heat it in a reducing furnace to a suitable temperature such as over six hundred degrees centigrade for several hours in the presence of a reducing agent, in excess, in the form of a gas, such as hydrogen, carbon monoxide, or illuminating gas, or in solid form, such as free carbon or coal, mixed with it. The purpose of this reduction is to bring the manganese compound down to manganese monoxide; and to assure that manganous oxide already present or formed by the action of heat, as would be the case with manganese carbonate, is not oxidized and as an example of the excess of reducing agent required, I point out that, for instance, where three and eight-tenths per centum of carbon is theoretically required for the reduction, five per centum is sufficient.

Reduction of the dioxide by hydrogen is as follows:—

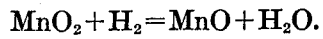
$$MnO_2 + H_2 = MnO + H_2O.$$

Manganese values in the ore having been reduced to the monoxide form, as just described, it is important that the ore be cooled out of contact with the air to prevent reoxidation, and this may be effectively accomplished by immediately quenching the hot ore in water, or, indeed, in the leaching solution which is the reagent in the next step.

The leaching solution is one of nitric acid or a manganous nitrate solution acidified with nitric acid.

Although the other oxides of manganese are not readily soluble in the nitric acid solution, manganese monoxide is, and the reduced ore is introduced to this leaching reagent to dissolve the manganese monoxide as follows:—

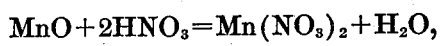
$$MnO + 2HNO_3 = Mn(NO_3)_2 + H_2O,$$

leaving behind the remainder of the ore, which is insoluble, except some possible soluble impurities which, I have found, are neglible both in character and quantity.

The strength and quantity of the leaching solution are important, since there must be sufficient solution to insure that the acid will all be neutralized by the amount of manganese in the ore treated. An ore containing say eighteen per centum of manganese is properly treated with a ten per centum nitric acid solution. The leaching may be aided by heat, say to a temperature of approximately eighty five degrees centigrade, under which condition solution may be completed in one hour. In the case of the use of a manganous nitrate solution acidified with nitric acid as a solvent, the solvent should contain from eight per centum to ten per centum of nitric acid, this strength being preferable to secure practical concentration of manganous nitrate.

The clear neutral manganous nitrate solution is then drawn off or otherwise separated from the insoluble remainder of the ore, and is carried to suitable evaporating apparatus and boiled down to separation of solid manganous nitrate, and to complete dryness if desired. I have found that the solution, registering about thirty degrees Baumé, yields a considerable separation of solid manganous nitrate upon concentration to half volume, and separation to this extent, rather than to complete dryness, is preferable for economic reasons.

The solid manganous nitrate is then subjected to heat, from approximately one hundred and twenty degrees to two hundred degrees centigrade (manganese dioxide begins to decompose appreciably above 220 degrees centigrade), with agitation, resulting in the following decomposition:—

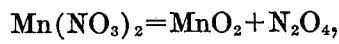

$$Mn(NO_3)_2 = MnO_2 + N_2O_4,$$

the manganese dioxide being a commercially desirable product, and the nitrogen peroxide being carried to suitable apparatus for restoring nitric acid, as follows,

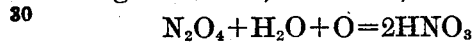

$$N_2O_4 + H_2O + O = 2HNO_3$$

for use in the treatment of fresh charges of ore. Where manganous nitrate solution acidified with nitric acid is used for the leaching, the neutral manganous nitrate solution resulting in the leaching operation is divided, part being carried to the evaporating apparatus, as hereinbefore described, and part to the apparatus for forming nitric acid, in such proportion as to result in a ten per centum acid solution for use in further leaching.

The accompanying drawing, which is purely diagrammatic and is fully supplied with legends so as to speak for itself, illustrates the continuous and regenerative character of my process.

The tail comprises principally silica and iron as an oxide which is in magnetic form and which may be concentrated for commercial purposes as a by-product.

I claim:—

1. The process of recovering a manganese compound from manganese bearing ore, which comprises reducing manganese values of the ore to manganese monoxide, leaching the ore with a solution of nitric acid to form a solution of manganous nitrate, and decomposing said manganous nitrate into manganese dioxide and nitrogen peroxide.

2. The process of recovering a manganese compound from manganese bearing ore, which comprises reducing manganese values of the ore to manganese monoxide, leaching the ore with a solution of nitric acid to form a solution of manganous nitrate, decomposing said manganous nitrate into manganese dioxide and nitrogen peroxide, and then forming nitric acid solution by exposing said nitrogen peroxide to air and water, using the nitric acid thus formed to leach fresh charges of reduced ore.

3. The process of recovering a manganese compound from manganese bearing ore, which comprises heating the ore in the presence of an excess of reducing agent to reduce manganese values of the ore to manganese monoxide, leaching the ore thus reduced with a solution of nitric acid to form a solution of manganous nitrate, and decomposing said managanous nitrate into manganese dioxide and nitrogen peroxide.

4. The process of recovering a manganese compound from manganese bearing ore, which comprises heating the ore to a temperature of six hundred degrees centigrade in the presence of an excess of reducing agent to reduce the manganese content of the ore to manganese monoxide, leaching the ore thus reduced with a solution of nitric acid to form a solution of manganous nitrate, and decomposing said manganous nitrate into manganese dioxide and nitrogen peroxide.

5. The process of recovering a manganese compound from manganese bearing ore, which comprises grinding the ore to finely divided state and reducing manganese values to manganese monoxide, leaching the ore with a solution of nitric acid to form a solution of manganous nitrate, and decomposing said manganous nitrate into manganese dioxide and nitrogen peroxide.

6. The process of recovering a manganese compound from material containing manganous oxide, and acid-insoluble substance which comprises leaching the material with a solution of nitric acid of such strength and in such quantity that the acid will be neutralized by the amount of manganous oxide dissolved to form a solution of manganous nitrate, and decomposing said manganous nitrate into manganese dioxide and nitrogen peroxide.

7. The process of recovering a manganese compound from manganese bearing ore, which comprises reducing manganese values of the ore to manganese monoxide, leaching the ore with a solution of nitric acid to form a solution of manganous nitrate, separating solid manganous nitrate from said solution by evaporation, and subjecting said solid manganous nitrate to heat to decompose it to manganese dioxide and nitrogen peroxide.

8. The process of recovering a manganese compound from material containing manganous oxide, which comprises leaching the material with a solution of manganous nitrate acidified with nitric acid to form a neutral solution of manganous nitrate, separating said solution from the insolubles and decomposing said manganous nitrate into manganese dioxide and nitrogen peroxide.

9. The process of recovering a manganese compound from manganese bearing ore, which comprises reducing manganese values of the ore to manganese monoxide, leaching the ore with a solution of manganous nitrate acidified with approximately nine per centum of nitric acid to form a neutral solution of manganous nitrate, separating said solution from the insolubles and decomposing said manganous nitrate into manganese dioxide and nitrogen peroxide.

10. The process of recovering a manganese compound from material containing manganous oxide, which comprises leaching the material with a solution of manganous nitrate acidified with nitric acid to form a neutral solution of manganous nitrate, separating said solution from the insolubles, decomposing said manganous nitrate into manganese dioxide and nitrogen peroxide, and using said nitrogen peroxide to acidify manganous nitrate solution to treat fresh charges of material.

11. The process of recovering manganese from manganese bearing ore, which comprises reducing manganese values of the ore to manganese monoxide, leaching the ore with a solution of manganous nitrate acidified with nitric acid to form a neutral solution of manganous nitrate, separating said solution from the insolubles, separating solid manganous nitrate from a portion of said neutral solution by evaporation, subjecting said solid manganous nitrate to heat to decompose it to manganese dioxide and nitrogen peroxide, and combining said nitrogen peroxide and the remaining portion of said neutral solution and air and water to form a solution of manganous nitrate acidified with nitric acid for leaching fresh charges of ore.

12. The process of recovering manganese dioxide, which comprises grinding a manganese bearing ore to a finely divided state, heating the same in the presence of a reducing agent to reduce manganese values to manganese monoxide, leaching the ore thus reduced with a solution of nitric acid to form a solution of manganous nitrate, separating solid manganous nitrate from said solution by evaporation, and heating said solid manganous nitrate to decompose it to manganese dioxide and nitrogen peroxide.

13. The process of recovering manganese dioxide, which comprises grinding a manganese bearing ore to a finely divided state, heating the same in the presence of a reducing agent in excess to reduce manganese values to a manganese monoxide, leaching the ore thus reduced with a solution of nitric acid of such strength and in such quantity as to form a neutral solution of manganous nitrate, separating said solution from the insolubles, separating solid manganous nitrate from said solution by evaporation, and subjecting said solid manganous nitrate to heat to decompose it to manganese dioxide and nitrogen peroxide.

14. A process of recovering manganese values from ore containing manganese dioxide which comprises converting manganese dioxide to manganous oxide, leaching manganous oxide from the ore with a solution capable of dissolving the manganous oxide and incapable of dissolving other material of the ore, said solution being characterized by an acid content sufficient to neutralize the basicity of the manganous oxide dissolved, separating the solution from the other material, and recovering manganese values from the solution.

In witness whereof, I hereunto subscribe my name this 16th day of July, 1925.

N. ARTHUR LAURY.